United States Patent Office 3,337,736
Patented Aug. 22, 1967

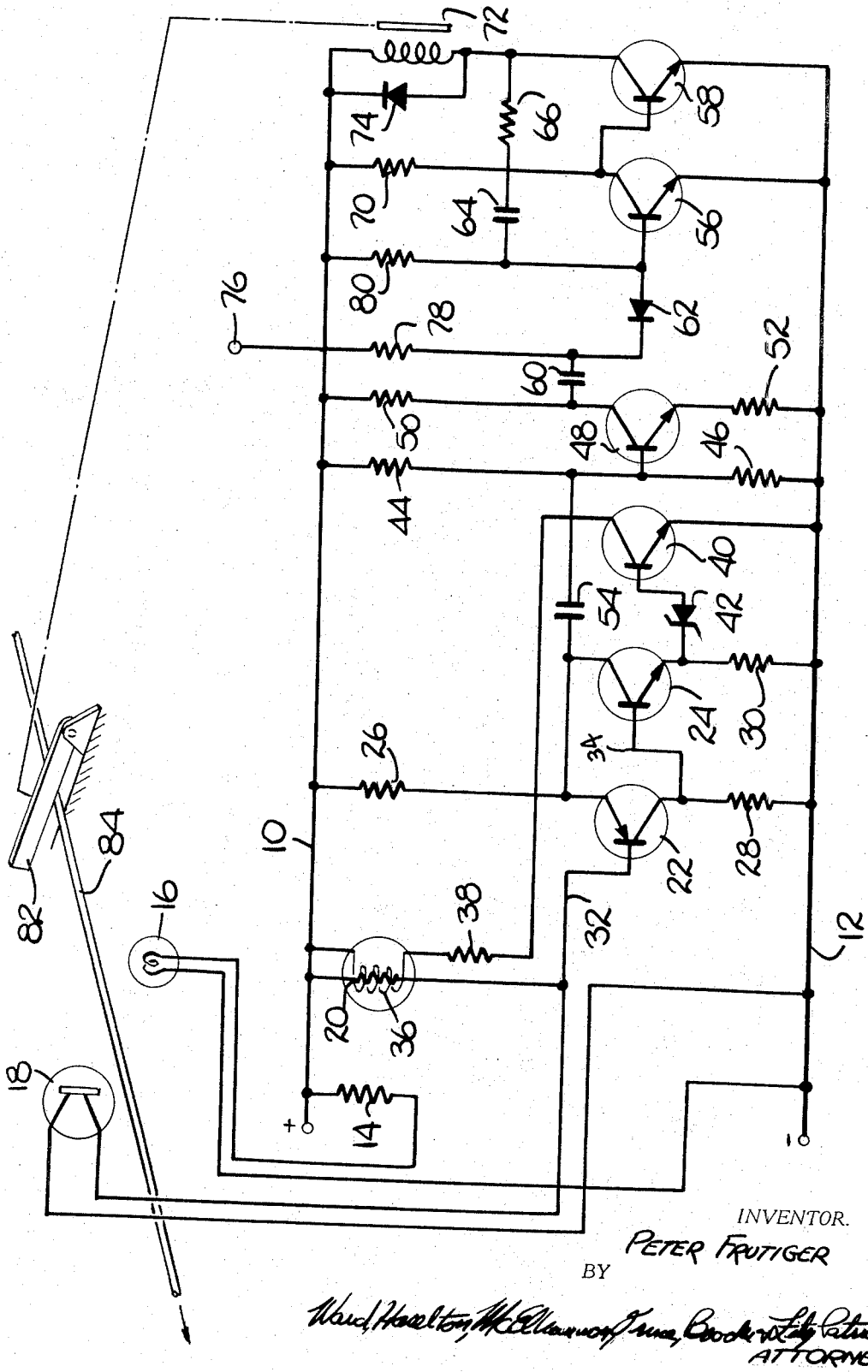

3,337,736
PHOTO-ELECTRIC DETECTION SYSTEM WITH SELF-COMPENSATION FOR CHANGES IN INCIDENT LIGHT
Peter Frutiger, Obere Kirchgasse 3, Winterthur, Zurich, Switzerland
Filed June 4, 1965, Ser. No. 461,247
8 Claims. (Cl. 250—205)

This invention relates to thread monitoring devices and more particularly it includes a novel circuit arrangement for use with photo-electric type slub detectors.

In order to detect irregularities in the diameters of yarns and filaments passing through continuous processing machinery, an arrangement is required which will either interrupt the running of the yarn when an irregularity in thickness occurs, i.e., when the actual diameter of the yarn deviates from the standard diameter, or which will, for example, count the number of irregularities. Generally, this is accomplished by causing a source of light to illuminate a photo-sensitive or photo-electric cell and thereby develop an electric current in an electric circuit connected to the photo-electric cell. The yarn is run between the light source and the photo-sensitive cell so that the amount of light which actually reaches the cell is restricted according to the thickness of the yarn. When sudden irregularities in the yarn diameter occur, there is a temporary interference to the mean light, thus causing a temporary alteration of the mean current in the electric circuit connected to the photo-electric cell. This short current pulse is used through an amplifier circuit for actuating a mechanism which, for example, cuts the yarn with a small knife.

The mechanism is released only when the temporary change in the yarn diameter exceeds a specific minimum value and the mechanism actuates only when the short current pulse or a voltage pulse produced by this current exceeds a specific setting.

The changes in the illumination of a photo-electric cell produced by irregularities in yarn passing thereby are proportional to the absolute mean illumination of the cell. Thus, since arrangements of this type operate by evaluation changes of the absolute illumination, the counting or cutting mechanism only operates when the change in the mean illumination exceeds a predetermined value. It has therefore been essential to keep the absolute mean illumination of the photo-electric cell constant in time.

Changes in the mean illumination may be caused by dirt in the space between the light source and the photo-electric cell, changes in the light intensity of the illuminating lamp or changes in the operating voltage of the light source. It has been the practice therefore, to provide a device for automatically adjusting the mean illumination of the photo-electric cell to a constant mean value when the mean illumination undergoes slow changes.

The present invention provides an arrangement in which the mean illumination need not be automatically kept at a constant level. According to the present invention a current or voltage pulse of constant amplitude is supplied to the actuating mechanism when rapid changes in the mean illumination of the cell occur, irrespective, within certain limits, of variations in the mean value of such illumination. Thus the sensitivity of the device can be adjusted to a predetermined constant value irrespective of the mean amount of light emited from the lamp.

The voltage pulse which actuates the release mechanism is kept constant by causing the current which flows through the photo-electric cell also to flow through a suitable circuit component, thereby generating a proportional voltage which is compared to a given constant reference voltage. The voltage generating circuit component is adjustable and acts continuously to readjust the voltage produced by the mean photo-electric current, up to the given constant reference voltage. This adjustment is, however, only performed when relatively slow temporary changes occur in the photo-electric current. No adjustment takes place on rapid temporary changes. The circuit component may, for example, consist of an amplifier whose degree of amplification is regulated by the photo-electric current; and having means, of course, which ensure that this regulation takes place only when the photo-electric current undergoes slow but not rapid changes. The adjustable circuit component which is used in connection with the illustrative embodiment, described hereinbelow, is particularly suitable for this purpose; and will be seen to incorporate a so-called "NTC" or negative temperature coefficient resistor whose resistance value varies with temperature. The function of this NTC resistor in connection with the device dealt with here will be described in detail hereinafter.

With the arrangement of the present invention it is always possible to produce a constant voltage pulse at the actuating mechanism even when slow changes in the illumination of the photo-electric cell occur due to a change in the yarn diameter of a given relative amount. Without such a regulating device the voltage pulse produced at the actuating mechanism would, for example, only be half its height when the main illumination of the photoelectric cell dropped to half its value.

According to the present invention, there is provided in connection with devices in which rapid relative changes in illumination are to be transformed into voltage pulses proportional to these changes, a special circuit component which is controlled by the mean amount of illumination in such a way that the amplitudes of the voltage pulses become independent of the mean value of the illumination.

Th manner in which this automatic adjustment to a constant actuating voltage pulse is made, i.e., by means of the current produced in a photo-sensitive element, stands in contrast to arrangements previously described, i.e., where the light intensity of the lamp itself is regulated in order to keep the actuating pulse constant. The readjustment described herein is efficient in that it is more economical because, when the lamp intensity is readjusted, larger electrical loads must generally be handled than when a circuit component as described above is regulated by the photo-electric current.

A particularly practical arrangement is described below. This arrangement makes use of an NTC type resistor as a control element in a suitable circuit. A circuit such as described hereinbelow has undergone testing and was found to function perfectly even under very considerable fluctuations in the mean illumination of the photo-electric cell.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein the figure is a schematic illustrating the arrangement of a system which embodies the present invention.

In the system of the figure, there is provided positive and negative conductors designated respectively at 10 and 12, connected respectively to the positive and negative terminals of a direct current electrical power source (not shown). A resistor 14 and a lamp 16 are connected in series across the conductors 10 and 12, to provide continuous illumination. A photosensitive element 18 and a negative temperature coefficient (NTC) resistor 20 are also connected in series across the conductors 10 and 12.

A two stage transistor amplifier, comprising a first stage transistor 22, of the p-n-p variety and a second stage transistor 24, of the n-p-n variety are also connected between the conductors 10 and 12. The emitter of the first transistor 22 and the collector of the second transistor 24 are together connected via a resistor 26 to the positive conductor 10. The collector of the first transistor 22 is connected via an individual resistor 28 to the negative conductor 12 while the emitter of the second transistor 24 is connected via another individual resistor 30 to the negative conductor 12.

A photosensitive element output line 32 is connected at one end at a point between the photosensitive element 18 and the NTC resistor 20; while its other end is connected to the base of the first transistor 22. Outputs from the collector of the first transistor are communicated via a line 34 to the base of the second transistor 24.

A heater coil 36 is wound around the NTC resistor 20 and is connected at one end to the positive conductor 10. The other end of the heater coil is connected via a resistor 38 and through the collector and emitter of a third transistor 40 to the negative conductor 12. A zener diode 42 is connected between the emitter of the second transistor 24 and the base of the third transistor 40. The zener diode is directed such that it will not pass current from the second to the third transistor until the voltage at the emitter of the second diode exceeds the breakdown potential of the zener diode.

A voltage divider circuit comprising a pair of series connected resistors 44 and 46 is provided across the positive and negative conductors 10 and 12. The potential which occurs between these resistors is communicated to the base of a fourth transistor 48 whose collector and emitter are connected respectively, through associated resistors 50 and 52 to the positive and negative conductors 10 and 12. The potential at the base of the fourth transistor 48 is further controlled by a connection, including a capacitor 54, one side of which is connected to the base of the fourth transistor 48 and the other side of which is connected to the collector of the second transistor 24 and the emitter of the first transistor 22.

A pulse responsive monostable binary circuit including fifth and sixth transistors 56 and 58 is connected between the positive and negative conductors 10 and 12 beyond the fourth transistor 48. The collector of the fourth transistor is connected to the base of the first stage of the binary circuit, i.e., the fifth transistor 54 via a capacitor 60 and a diode 62. The base of the fifth transistor 54 is also connected via another capacitor 64 and a resistor 66 to the collector of the sixth transistor 56. The emitters of both the fifth and sixth transistors are connected to the negative conductor 12 while their collectors are connected respectively via a resistor 70 and actuating mechanism 72, to the positive conductor 10. The collector of the fifth transistor 54 is also connected to the base of the sixth transistor 56. A further diode 74 is connected in parallel with the actuating mechanism 70 and is directed toward the positive conductor 10 to permit the actuating mechanism to be actuated during conduction of the sixth transistor 56 but to allow release of stored energy in the mechanism 70 after actuation.

A sensitivity control is also provided. This control includes a terminal 76 for receiving a control voltage from an external source (not shown). This control voltage is communicated via a resistor 78 to a point between the capacitor 58 and the diode 60. The other side of the diode 60 is connected via a further resistor 80 to the positive conductor 10.

The actuating mechanism 70 is connected to a utilization means or other output. For example, as illustrated schematically there may be provided a knife 82 arranged to be brought down to sever a yarn or thread 84 passing between the lamp 16 and the photosensitive cell 18 upon operation of the actuating mechanism 70.

The system operates in the following manner.

The electric current produced by the lamp 16 in the photo-sensitive element 18 produces a mean voltage in the NTC resistor 20. The resistance value of the NTC resistor depends strongly on its temperature. The temperature of the resistance is controlled by the current flowing through the heater coil 36. The mean voltage at the NTC resistor (which occurs on line 32) is amplified in the two stage transistor amplifiers 22 and 24. If, in consequence of a higher photo-electric current, the output voltage across the resistor 30 exceeds the breakdown potential of the zener diode, current will flow through the third transistor 40, and through the heating coil 36, this heating and lowering the resistance of the NTC resistor to such an extent that the zener breakdown voltage is again reproduced at the resistor 30.

Since the time constant of the heater coil 36 is relatively large (order of magnitude about one second), only slow fluctuations in the photo-electric current are controlled. Rapid changes in the photo-electric current pass through the condensers 54 and 60, and through the fourth transistor 48 to the diode 62. If the magnitude of the voltage pulses occurring at this diode exceed a given amount governed by the voltage at the control terminal 76, then the binary, including the fifth and sixth transistors 56 and 58 will go into operation. This stimulates the actuating mechanism 72 which in turn operates a utilization means such as the knife 82 which cuts the yarn 84.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. In apparatus for indicating irregularities in material which moves across a beam of light the combination comprising a photo-electric cell positioned in said beam beyond said material, a variable resistor, said photo-electric cell and said variable resistor being connected together in series across a source of electrical potential, a pair of branch circuits each connected to receive the voltage potentials which occur at a point between said photocell and said variable resistor, one of said branch circuits being operative to produce output signals in response to the potentials which fluctuate with a higher degree of rapidity, the other branch circuit being operative to vary the resistance characteristic of said variable resistor in degenerative manner in response to potentials which fluctuate with a lower degree of rapidity.

2. In apparatus for indicating irregularities in material which moves across a beam of light the combination comprising a photo-electric cell positioned in said beam beyond said material, a temperature sensitive variable resistor, said photo-electric cell and said temperature sensitive variable resistor being connected together in series across a source of electrical potential, an electrically controlled heating means, means connecting said heating means to respond to voltages which occur at a point between said photocell and said temperature sensitive resistor, said heating means being arranged in conjunction with said temperature sensitive variable resistor such that the voltages which result from an increase in current through said photocell operate through said heating means to reduce the resistance of said temperature sensitive variable resistor, and output means connected to respond to the voltages which fluctuate at a point between said photocell and said temperature sensitive variable resistor with a degree of rapidity which is higher than that to which the heating system responds.

3. Apparatus as in claim 2 wherein said output means comprises a high pass filter including a capacitor connected in the path of signal flow and a resistor shunting this path, a diode connected in said path and means for applying a sensitivity control voltage to said diode.

4. In apparatus for indicating irregularities in material which moves across a beam of light the combination comprising a photo-electric cell positioned in said beam beyond said material, a resistor having a negative thermal coefficient, an electrically controlled heater arranged in close proximity with said resistor, circuit means connecting said heater to be operated in response to the lowering of potential across said photocell, and an output circuit connected to respond to voltages across said photocell which fluctuates with a degree of rapidity which is higher than that to which said heater responds.

5. In apparatus for indicating irregularities in material which moves across a beam of light the combination comprising a photo-electric cell positioned in said beam beyond said material, a resistor having a negative thermal coefficient, an electrically controlled heater arranged in close proximity with to change the temperature of said resistor, first circuit means connecting said heater to be operated in response to the lowering of potential across said photocell, a threshold device device arranged in said first circuit means and operative to limit actuation of said heating means to the lowering of the potential across said photocell below a given limit, and second circuit means arranged to produce output signals in response to the voltage changes across said photocell which occur with a degree of rapidity which is higher than that to which said heater responds.

6. Apparatus as in claim 5 wherein said threshold device comprises a zener diode interposed in the circuit which activates said electrically controlled heater.

7. In apparatus for indicating irregularities in material which moves across a beam of light, the combination comprising a photo-electric cell positioned in said beam beyond said material, a resistor having a negative thermal coefficient connected in series circuit relationship with said photo-electric cell across a source of electrical potential, amplifier means arranged to amplify the variations in potential which occur at a point between said photo-electric cell and said resistor, heater means comprising an electrical heater coil in close proximity to said resistor, means connecting said heater means to be operated in response to outputs from said amplifier means and signal output means including a differentiation circuit arranged to respond to signal changes produced at the output of said amplifier means with a preselected degree of rapidity.

8. In apparatus for indicating irregularities in material which moves across a beam of light, the combination comprising a photo-electric cell positioned in said beam beyond said material, a resistor having a negative thermal coefficient connected in series circuit relationship with said photo-electric cell across a source of potential, a p-n-p transistor having its emitter and collector connected via resistor means across said source of potential, means connecting the base of said transistor to receive changes in potential which occur at a point between said negative thermal coefficient resistor and said photocell, an electrical heating coil in proximity to said negative temperature coefficient resistor, means connecting said heating coil to operate in response to potentials on the emitter side of said transistor, and signal output means connected to respond to potentials at the collector side of said transistor which fluctuate with a greater degree of rapidity than that to which said heating coil responds.

References Cited
UNITED STATES PATENTS 2,878,395    3/1959    Mindheim _____ 250—219
2,922,891    1/1960    Turner et al. _____ 250—218

RALPH G. NILSON, *Primary Examiner.*

M. ABRAMSON, *Assistant Examiner.*